United States Patent [19]

Nishiyama

[11] 4,424,002
[45] Jan. 3, 1984

[54] DEVICE FOR CONVERSION BETWEEN FLOW AND ROTATION

[76] Inventor: Osamu Nishiyama, 3-9, Nagate-cho 5-chome, Nada-ku, Kobe, Japan

[21] Appl. No.: 249,460

[22] Filed: Mar. 31, 1981

[30] Foreign Application Priority Data

Apr. 3, 1980 [JP] Japan ................................. 55-043843
Nov. 7, 1980 [JP] Japan ................................. 55-157215

[51] Int. Cl.³ .............................................. F03D 3/06
[52] U.S. Cl. ..................................... 416/111; 416/119
[58] Field of Search ................. 416/17, 111, 119, 108, 416/112 A, 101, 87

[56] References Cited

U.S. PATENT DOCUMENTS

| 441,461 | 11/1890 | Aret ................................. 416/17 X |
| 457,273 | 8/1891 | Hall ................................ 416/119 X |
| 745,745 | 12/1903 | Vojacek ............................. 416/111 |
| 1,772,119 | 8/1930 | Van Lammeren .................. 416/108 |
| 1,775,593 | 9/1930 | Kahn ................................. 416/108 |
| 4,097,190 | 6/1978 | White ............................. 416/111 X |
| 4,311,918 | 1/1982 | Vaseen ............................ 415/119 X |

FOREIGN PATENT DOCUMENTS

| 1028626 | 3/1978 | Canada ............................. 416/111 |
| 373438 | 4/1923 | Fed. Rep. of Germany ..... 416/111 |
| 505764 | 8/1920 | France .............................. 416/111 |
| 586270 | 3/1925 | France .............................. 416/111 |
| 633558 | 1/1928 | France .............................. 416/101 |
| 748194 | 6/1933 | France .............................. 416/111 |
| 915892 | 11/1946 | France ............................ 416/119 |
| 921518 | 5/1947 | France ............................ 416/111 |
| 925160 | 8/1947 | France ............................ 416/111 |
| 1118526 | 6/1956 | France ........................... 416/111 |
| 2307145 | 11/1976 | France ............................ 416/17 |
| 2385909 | 12/1978 | France ........................... 416/119 |

*Primary Examiner*—Everette A. Powell, Jr.
*Attorney, Agent, or Firm*—Wenderoth, Lind & Ponack

[57] ABSTRACT

A device for conversion between flow and rotation includes a fixed revolution center shaft integrally provided with a center sprocket, at least one vane having a self-rotation shaft and turnable about the revolution center shaft and on the self-rotation shaft, a vane sprocket fixed to the self-rotation shaft and having twice as many teeth as the center sprocket, and a chain connecting the two sprockets, whereby the vane rotates through 180° on the self-rotation shaft while it revolves around the revolution center shaft through 360°. The device, even if made comparatively small in size, can efficiently convert energy of a flow to rotational energy or vice versa since the orientation of the vane or vanes is continuously varied to enhance the efficiency. Thanks to the self-rotation of vane, the device has an additional advantage that foreign substances, such as string, rope and straw, are automatically removed.

10 Claims, 9 Drawing Figures

DEVICE FOR CONVERSION BETWEEN FLOW AND ROTATION

BACKGROUND OF THE INVENTION

The present invention relates to a device for conversion between flow and rotation, and more particularly to an impeller device or a runner device which can efficiently convert the energy of a flow, such as the flow of the wind or the river, to rotational energy or vice versa.

Conventional devices include those of propeller type or of multiple blade type and afford a relatively low output in spite of their size, as typified by the windmills in Holland. The low output of the conventional device is partly due to the fact that a flow hitting against the blades on one side of the rotation axis produces a negative torque while the flow impinging on the blades on the other side of the axis provides a positive torque. In order to get rid of the negative torque it is conceivable to provide baffle (guide) plates for introducing the flow only into one half of the device. This countermeasure however is still ineffective since the energy of the flow cannot be fully utilized.

The primary object of the present invention, in view of the above problem, is to provide a device for conversion between flow and rotation which, in spite of its small size, can efficiently collect the energy of the flow to produce a large output.

SUMMARY OF THE INVENTION

To fulfill this object, the invention provides a device comprising a revolution center shaft, at least one vane having a self-rotation shaft and turnable about the revolution center shaft and on the self-rotation shaft, and means for continuously converting turns of the vane around the revolution center shaft into half turns of the vane on the self-rotation shaft.

According to a preferred embodiment of the invention, the means for conversion comprises an expedient whereby the vane revolves along an eccentric orbit around the revolution center shaft. The embodiment enables the device to further improve its energy collecting efficiency.

BRIEF DESCRIPTION OF THE DRAWING

Various features and effects of the invention will become apparent from the description of embodiments given with reference to the accompanying drawings, in which:

Referring to FIG. 1 schematically showing a first embodiment, the reference character P designates the self-rotation shaft of a vane A as revolved through an angle of $\Theta$ from the reference line X—X' around a revolution center shaft O with a rotation radius of R. A non-rotatable sprocket CV fixed on the shaft O is connected through a chain D to a sprocket CW mounted on the shaft P of the vane A. The ratio of the number of the teeth of the sprocket CV to that of the sprocket CW is set at 1:2. The shafts O and P may be connected by any combination of sprockets, chains and gears instead of combining the sprockets CV, CW and the chain D, provided that the connection permits no slide.

The vane A having a width of B and a height of H rotates on its shaft P through 180° counterclockwise while the shaft P revolves clockwise around the shaft O through 360°. Supposing that a fluid having a force F per unit area is flowing in the direction of the arrow, a torque T acting to rotate the shaft P around the shaft O is given by the following equation.

$$T = F \times B \cos(\Theta/2) \times H \times \cos(\Theta/2) \times R = F \times B \times H \times R \cos^2(\Theta/2)$$

In the equation F is a factor which cannot be controlled while B, H and R can be controlled in the design of the device. It then is seen that by setting R small and by making B and H correspondingly larger the device can be rendered compact while maintaining constant the torque obtainable therewith.

Figure 1:
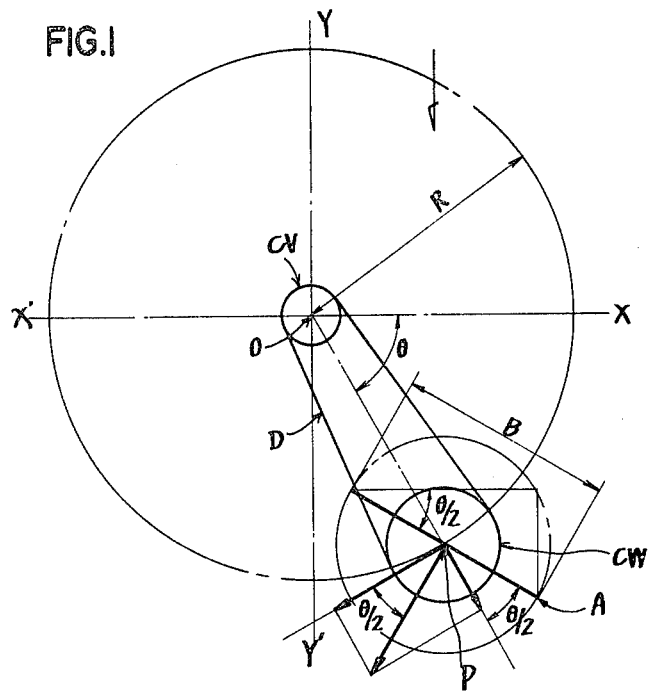
FIG. 1 is a diagram schematically showing a first embodiment according to the invention.
Figure 2:
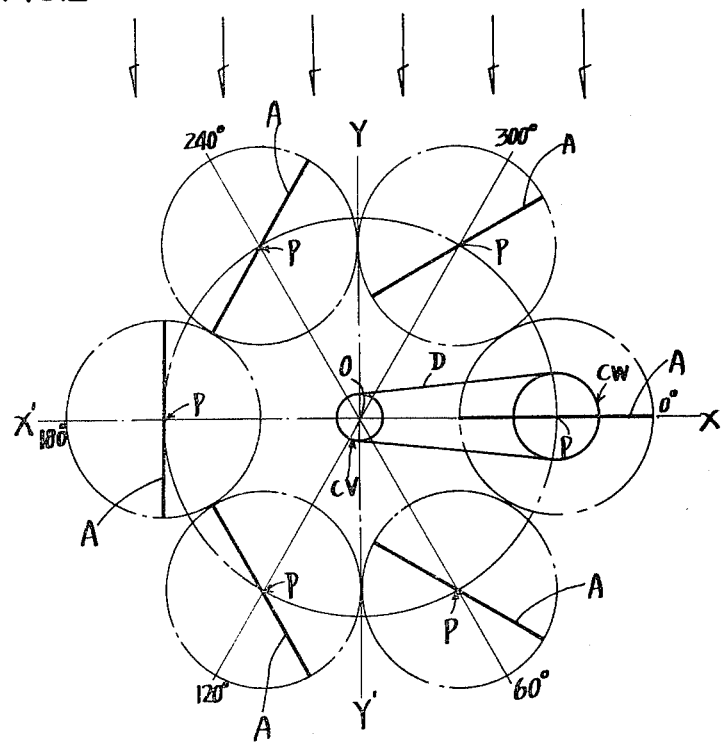
FIG. 2 is a diagram showing the orientation of the vane with respect to the reference line X—X' at various revolution angles.

FIG. 2 shows the inclination of the vane A with respect to the line X—X' as taken at an angular spacing of 60°. The inclination is 0° at $\Theta=0°$; 30° at $\Theta=60°$; 60° at $\Theta=120°$; 90° at $\Theta=180°$; 120° at $\Theta=240°$; 150° at $\Theta=300°$. A flow in the direction of the line Y—Y' acting on the vane A produces a clockwise torque at every revolution angle except a zero torque at 180°. A maximum torque is obtained at a revolution angle of 0°. Thus since at no point is produced a counterclockwise torque, the device is very efficient. It is to be noted here that since the inclinations of the vane A taken at all revolution angles are symmetrical with respect to the line X—X', the revolution of the vane A is reversed when the flow is reversed.

If there is only one vane, smooth operation of the device cannot be expected due to the existance of the dead point at a revolution angle of 180°. Thus it is required to provide the device with a plurality of vanes in order to smoothly operate the device.

Figure 3:
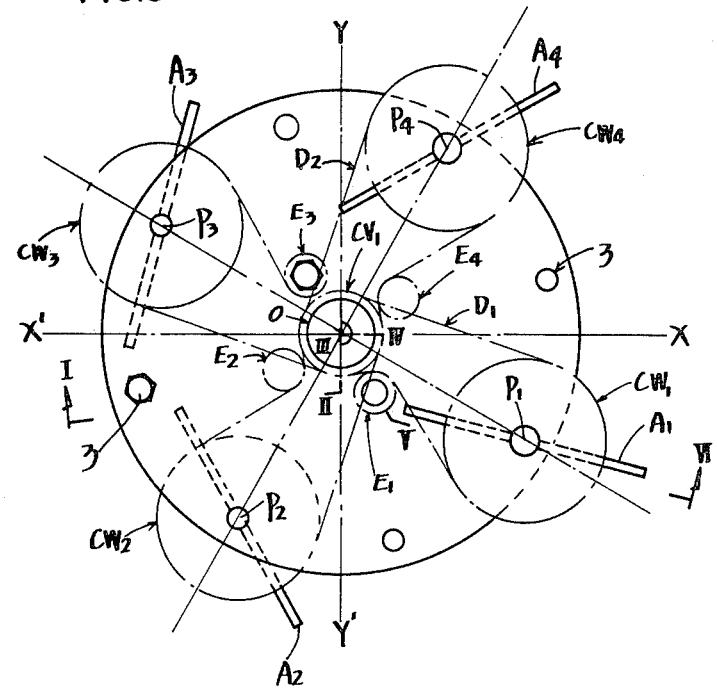
FIG. 3 is a plan view partly in section taken on the line X-XI-XII-XIII in FIG. 4 and showing the concrete construction of the first embodiment.
Figure 4:
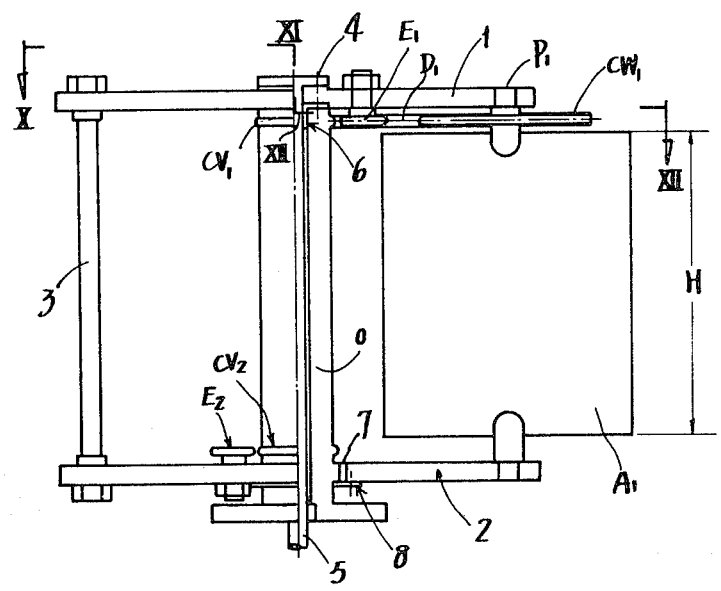
FIG. 4 is a view in vertical section taken on the line I-II-III-IV-V-VI in FIG. 3.
Figure 5:
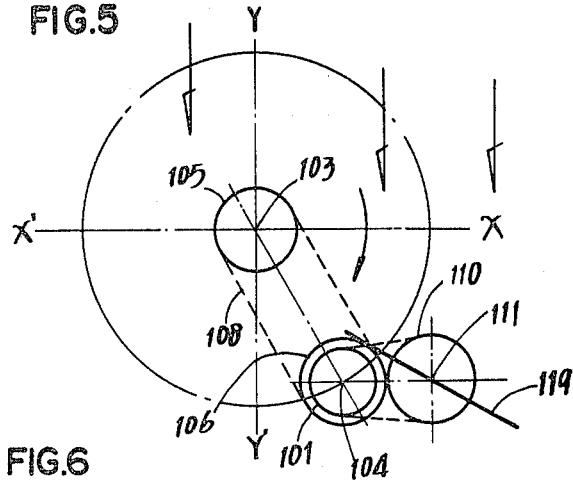
FIG. 5 is a diagram schematically showing a second embodiment of the invention.
Figure 6:
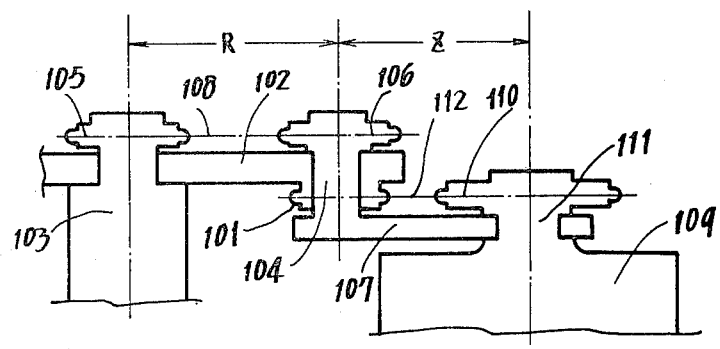
FIG. 6 is a view in vertical section showing the mechanism of the same.

The concrete construction of the first embodiment having a plurality of (four) vanes is illustrated in FIGS. 3 and 4. As seen, the four vanes $A_1$, $A_2$, $A_3$, and $A_4$ are mounted on respective self-rotation shafts $P_1$, $P_2$, $P_3$ and $P_4$ having sprockets $CW_1$, $CW_2$, $CW_3$, $CW_4$ and provided across discs 1 and 2. On the revolution center shaft O are provided sprockets $CV_1$ and $CV_2$ integrally therewith. Idle sprockets $E_1$ and $E_3$ are mounted on the disc 1 for guiding a chain $D_1$ interconnecting the sprockets $CW_1$, $CV_1$ and $CW_3$. Likewise idle sprockets $E_2$ and $E_4$ are provided on the disc 2 for guiding another chain $D_2$ interconnecting the sprockets $CW_2$, $CV_2$ and $CW_4$. The disc 1 and 2 are tightly tied together by tie rods 3. Indicated at 5 is a transmission shaft connected to the disc 1 by a bolt 4; at 6 a bearing arranged between the shafts O and 5 and between the shaft O and the disc 1; at 7 another bearing provided between the shaft O and the disc 2; and at 8 an engagement plate fixed to the disc 2 and engaging the shaft O for preventing the disc 2 from being lifted.

If the wind flows in the direction of the line Y—Y' in FIG. 3 and impinges on the vanes $A_1$-$A_4$, the vanes revolve clockwise around the shaft O while rotating counterclockwise on their respective shafts $P_1$-$P_4$ by the combined action of the chains and the sprockets, consequently affording clockwise torque to the discs 1 and 2 at all times. The produced torque is then transmitted through the disc 1 and the bolt 4 to the transmission shaft 5. If therefore the shaft 5 is connected to the input shaft of a generator, the wind power can be converted into electrical energy.

A second embodiment of the present invention will now be described with reference to FIGS. 5 to 8 wherein new reference numerals are given to all the components.

A revolution center shaft 103 having a fixed sprocket 105 rotatably supports a disc 102 which in turn rotatably supports an intermediate shaft 104 having a sprocket 106 with a distance R from the shaft 103. The shaft 104 is integrally formed with an arm 107 which rotatably supports a self-rotation shaft 111 a distance Z apart from the shaft 104. The shaft 111 is integrally provided with a sprocket 110 and a vane 109 having a width B and a height H. The sprockets 105 and 106 have the same number of teeth and are connected by a chain 108. The sprocket 110 is connected by a chain 112 to a sprocket 101 fixed to the disc 102. The number of teeth of the sprocket 110 is double that of the sprocket 101. It is now seen that the disc 102 can rotate around the revolution center shaft 103 while the arm 107 and the vane 109 can rotate on the shafts 104 and 111 respectively.

Figure 7:
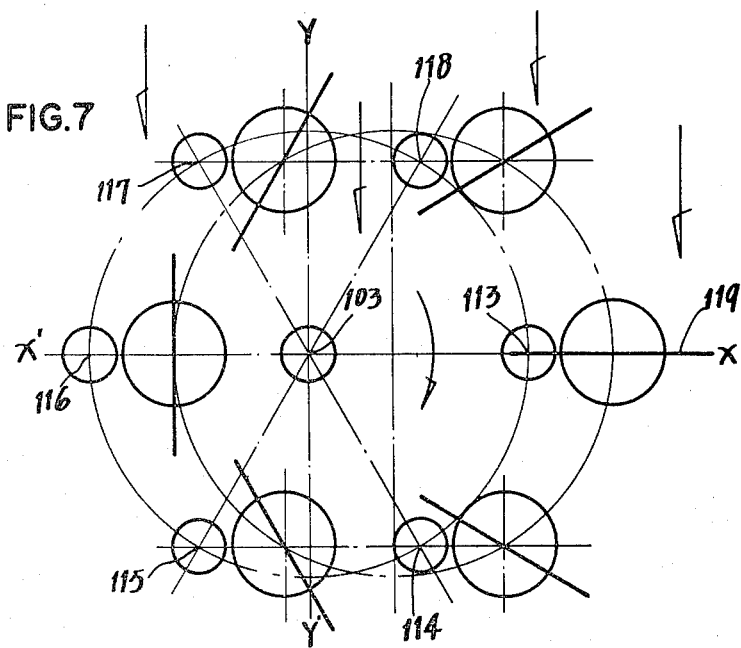
FIG. 7 is a diagram showing the eccentric orbit and inclination of the vane.

With the construction described above, if the intermediate shaft 104 revolves along a circle having a radius of R around the revolution center shaft 103, i.e., through points 13–18, the shaft 111 revolves through an eccentric orbit around the shaft 103 while always maintaining the distance Z and relative position with respect to the intermediate shaft 104. During the revolution the orientation of the vane 109 changes continuously as shown in FIG. 7; that is, the vane 109 performs a half turn side by side with a single turn of the shaft 104 around the center shaft 103.

Figure 8:
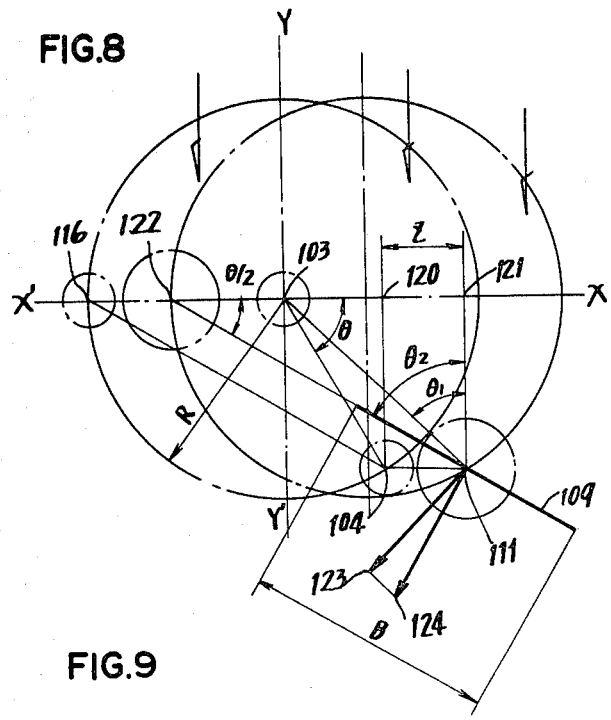
FIG. 8 is a diagram illustrating the theory of the torque produced in accordance with the invention.

FIG. 8 shows the state of the vane 9 when the intermediate shaft 104 is revolved through an angle of Θ around the center shaft 103. In the figure lines passing through the points (shafts) 104 and 111 and perpendicular to the line X—X' intersect with the line X—X' at 120 and 121 respectively. The numeral 122 designates the position of the shaft 111 when the shaft 104 have revolved through 180°. The numeral 124 designates a point on a line perpendicular to the line segment $\overline{122 \cdot 111}$ and the line segment $\overline{111 \cdot 124}$ can be considered as the vector of a component force acting perpendicularly on the vane. Likewise the numeral 123 designates a point on a line perpendicular to the line segment $\overline{103 \cdot 111}$ and the line segment $\overline{111 \cdot 123}$ can be considered as the vector of a component force acting to revolve the vane around the shaft 103.

From the figure, the following equations are easily obtained.

$\angle 103 \cdot 116 \cdot 104 = \angle 103 \cdot 122 \cdot 111 = \angle 122 \cdot 111 \cdot 104 = \theta/2$ $$\overline{122 \cdot 111} = \overline{116 \cdot 104} = 2R\cos\theta/2 = 2R\sqrt{\frac{1+\cos\theta}{2}} \quad (1)$$

$$= R\sqrt{2}\sqrt{1+\cos\theta}$$

$$\overline{111 \cdot 121} = \overline{4 \cdot 25} = R\sin\theta \quad (2)$$

$$\overline{103 \cdot 121} = \overline{103 \cdot 120} + \overline{120 \cdot 121} \quad (3)$$
$$= R\cos\theta + Z$$

$$\overline{103 \cdot 111} = \sqrt{(\overline{121 \cdot 111})^2 + (\overline{103 \cdot 120} + \overline{120 \cdot 121})^2} \quad (4)$$
$$= \sqrt{R^2\sin^2\theta + (R\cos\theta + Z)^2}$$
$$= \sqrt{R^2\cos^2\theta + 2RZ\cos\theta + Z^2 + R^2\sin^2\theta}$$
$$= \sqrt{R^2 + Z^2 + 2RZ\cos\theta}$$

$$\overline{122 \cdot 121} = \overline{116 \cdot 103} - \overline{116 \cdot 122} + \overline{103 \cdot 121} \quad (5)$$
$$= R - Z + R\cos\theta + Z$$
$$= R(1 + \cos\theta)$$

Generally, $$\cos(\Theta_2 - \Theta_1) = \cos\Theta_2 \cos\Theta_1 + \sin\Theta_2 \sin\Theta_1 \quad (6)$$

Supposing $\angle 122 \cdot 111 \cdot 121 = \Theta_2$ and $\angle 103 \cdot 111 \cdot 121 = \Theta_1$, the following equations are derived from FIG. 8 and the foregoing equations 1 to 5.

$$\cos\theta_2 = \frac{R\sin\theta}{R\sqrt{2}\sqrt{1+\cos\theta}} = \frac{\sin\theta}{\sqrt{2}\sqrt{1+\cos\theta}} \quad (7)$$

$$\cos\theta_1 = \frac{R\sin\theta}{\sqrt{R^2 + Z^2 + 2RZ\cos\theta}} \quad (8)$$

$$\sin\theta_2 = \frac{R(1+\cos\theta)}{R\sqrt{2}\sqrt{1+\cos\theta}} = \frac{1+\cos\theta}{\sqrt{2}\sqrt{1+\cos\theta}} \quad (9)$$

$$\sin\theta_1 = \frac{R\cos\theta + Z}{\sqrt{R^2 + Z^2 + 2RZ\cos\theta}} \quad (10)$$

Substituting (7), (8), (9), and (10) into (6) gives $$\cos(\theta_2 - \theta_1) = \frac{\sin\theta}{\sqrt{2}\sqrt{1+\cos\theta}} \times \frac{R\sin\theta}{\sqrt{R^2 + Z^2 + 2RZ\cos\theta}} +$$
$$\frac{1+\cos\theta}{\sqrt{2}\sqrt{1+\cos\theta}} \times \frac{R\cos\theta + Z}{\sqrt{R^2 + Z^2 + 2RZ\cos\theta}}$$
$$= \frac{R\sin^2\theta + (1+\cos\theta)(R\cos\theta + Z)}{\sqrt{2}\sqrt{1+\cos\theta}\sqrt{R^2 + Z^2 + 2RZ\cos\theta}}$$

Supposing that the vane has a width B and a height H and that a flow exerts a force F per unit area, the torque T produced at a revolution angle Θ is given by the following equation.

$$T = \overline{103 \cdot 111} \times H \times B \times \cos\theta/2 \times F \times \cos(\theta_2 - \theta_1) \quad (12)$$

$$= \sqrt{R^2 + Z^2 + 2RZ\cos\theta} \times H \times B \times \sqrt{(1 + \cos\theta)/2} \times F \times$$

$$\frac{R\sin^2\theta + (1 + \cos\theta)(R\cos\theta + Z)}{\sqrt{2}\sqrt{1 + \cos\theta}\sqrt{R^2 + Z^2 + 2RZ\cos\theta}}$$

$$= H \times B \times F \times \tfrac{1}{2} \{R\sin^2\theta + (1 + \cos\theta)(R\cos\theta + Z)\}$$

$$= H \times B \times F \times \tfrac{1}{2} \{R\sin^2\theta + R\cos\theta + Z + R\cos^2\theta + Z\cos\theta\}$$

$$= H \times B \times F \times \tfrac{1}{2} (R + R\cos\theta + Z + Z\cos\theta)$$

$$= H \times B \times F \times \tfrac{1}{2} \times (R + Z)(1 + \cos\theta)$$

or $$= H \times B \times F \times (R + Z)\cos^2\tfrac{\theta}{2} \quad (12')$$

In order to compare the second embodiment with the first embodiment, the difference in torque therebetween is taken.

$$H \times B \times F \times (R+Z)\cos^2\Theta/2 - H \times B \times F \times R \cos^2\Theta/2 = H \times B \times F \times Z \times \cos^2(\Theta/2) \quad (13)$$

Since $\cos^2 \Theta/2 \geqq 0$ the second embodiment exceeds the first embodiment in torque at any $\Theta$ value by the amount given by the equation (13).

Integrating the torque along the entire orbit gives $$2 \times H \times B \times F \times Z \times \int_0^\pi \cos^2\tfrac{\theta}{2} d\theta \quad (14)$$

$$= 2 \times H \times B \times F \times Z \times \int_0^\pi \tfrac{1}{2}(1 + \cos\theta)d\theta$$

$$= H \times B \times F \times Z \times \left( \int_0^\pi d\theta + \int_0^\pi \cos\theta d\theta \right)$$

$$= H \times B \times F \times Z \times \{[\theta]_0^\pi + [\sin\theta]_0^\pi\}$$

$$= H \times B \times F \times Z \times \pi$$

It is seen that the second embodiment affords, per single revolution of the vane around the revolution center shaft, more energy than the first embodiment by the amount indicated in (14). If it is now supposed that $Z = \tfrac{1}{2}R$, then $$H \times B \times F \times Z \times \pi = \tfrac{1}{2} \times H \times B \times R \times \pi \quad (15)$$

The integration of the torque of the first embodiment throughout the orbit of the vane gives $$2 \times H \times B \times F \times R \times \int_0^\pi \cos^2\tfrac{\theta}{2} d\theta \quad (16)$$

$$= H \times B \times F \times R \times \pi$$

Likewise the integration of the torque of the second embodiment along the eccentric orbit of the vane gives $$2 \times H \times B \times F \times (R + Z) \times \int_0^\pi \cos^2\tfrac{\theta}{2} d\theta \quad (17)$$

$$= H \times B \times F \times (R + Z) \times \pi$$

Taking (17) ÷ (16)

$$\frac{R + Z}{R} = 1 + \frac{Z}{R} \quad (18)$$

The equation (18) suggests that an improvement of $Z/R \times 100\%$ in energy collecting efficiency can be obtained with the second embodiment.

Theoretically speaking, the above improvement is attributable to the fact that the time required for the vane to pass through the left hand side of the line Y—Y', where the efficiency is low, is reduced in the case of the second embodiment.

If it is possible to make the device large enough to be provided with a computer for orienting the vane(s) toward the best suited direction, the device will have a further improved efficiency.

Figure 9:
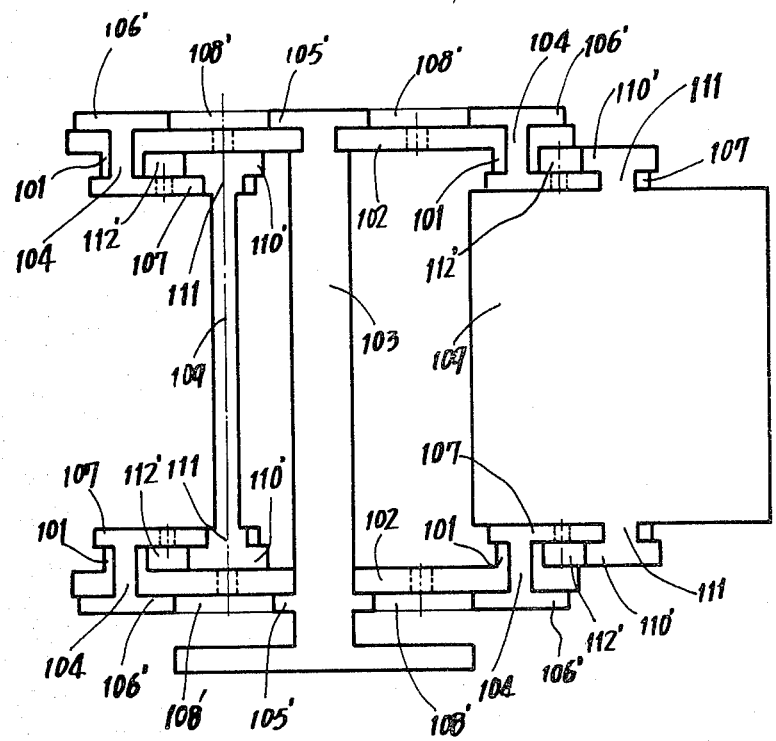
FIG. 9 is a view in vertical section showing a slight modification of the second embodiment.

A slight modification of the second embodiment will now be described with reference to FIG. 9 in which the parts corresponding to those of the second embodiment are indicated by the same reference numerals. The modification differs from the second embodiment in that there are provided a plurality of vanes for smooth operation of the device and that the sprockets 101, 105, 106, 110 are replaced by gears 101', 105', 106', 110', and the chains 108, 112 by idle gears 108', 112'.

The device of the present invention, as embodied hereinbefore, can be rendered small in size but yet efficiently derive electrical power from any flow source such as the wind, a river or the sea. The device, if made small, is also applicable to the measurement of flow velocity and flow rate by placing it in a large diameter pipe.

On the other hand, the device, if provided with a motor for driving the center shaft, is serviceable as a blower or as a pump. Particularly the device is the best suited as a substitute for a schneider propeller since the positions (revolution angles) at which the vane produces zero torque and maximim torque are adjustable by rotating the revolution center shaft. Further it is worthy of note that since foreign substances, such as string, rope and straw caught by the vane will be automatically removed by the self-rotation of the vane, the device is operable under any circumstances regardless of its application.

What is claimed is:

1. A device for conversion between flow energy flowing in a flow direction and rotational energy, comprising:
    a fixed revolution center shaft;
    two opposing discs respectively rotatably mounted at their centers on opposite ends of the revolution center shaft;
    a vane assembly, the vane assembly including:
    first and second intermediate shafts axially aligned along an intermediate axis of rotation, rotatably mounted at corresponding locations on the peripheral portions of the two discs,
    first and second arms respectively fixed to the first and second intermediate shafts and extending in only one corresponding direction therefrom, only one self-rotation shaft rotatably mounted to and extending between the first and second arms a first predetermined distance from the first and second intermediate shafts, and only one vane fixed to the self-rotation shaft; and first transmitting means for continuously converting full turns of the discs on the revolution center shaft to corresponding full turns of the first and second intermediate shafts in such a manner that a line passing through the intermediate axis of rotation and the self-rotation shaft is always perpendicular to the flow direction, whereby the vane revolves along an eccentric circular path about the revolution center shaft, and second transmitting means for continuously converting full turns of the intermediate shafts on the discs to corresponding half turns of the vane on the self-rotation shaft in such a manner that the vane is oriented perpendicular to the flow direction when the self-rotation shaft is furthest from the first center shaft and parallel to the flow direction when the self-rotation shaft is closest to the center shaft, whereby the vane maximally collects energy from the flow energy.

2. A device as in claim 1, wherein the first transmitting means comprises:

a center gear fixed to the revolution center shaft;

a shaft gear fixed to one of the first and second intermediate shafts, the shaft gear and the center gear each having a same number of teeth; and an inner idle gear having teeth meshing with the teeth of the center gear and the teeth of the shaft gear.

3. A device as in claim 1 or claim 2, wherein the second transmitting means comprises an intermediate gear having a number of teeth, fixed to one of the two discs and rotatably surrounding one of the first and second intermediate shafts, a vane gear fixed to the self-rotation shaft and having twice as many teeth as the number of teeth of the intermediate gear, and an outer idle gear having teeth meshing with the teeth of the intermediate gear and the teeth of the vane gear.

4. A device as in claim 1, wherein the first transmitting means comprises:

a center sprocket fixed to the revolution center shaft;

a shaft sprocket fixed to one of the first and second intermediate shafts, the shaft sprocket and the center sprocket each having a same number of teeth; and an inner chain meshing with the teeth of the center sprocket and the teeth of the shaft sprocket.

5. A device as in claim 1 or claim 4 wherein the second transmitting means comprises:

an intermediate sprocket having a number of teeth, fixed to one of the two discs and rotatably surrounding one of the first and second intermediate shafts; a vane sprocket fixed to the self-rotation shaft and having twice as many teeth as the number of teeth of the intermediate sprocket; and an outer chain meshing with the teeth of the intermediate sprocket and the teeth of the vane sprocket.

6. A device for conversion between flow energy flowing in a flow direction and rotational energy, comprising:

a fixed center shaft extending along a first axis of rotation;

a plurality of vane assemblies;

support means, rotatably mounted to said fixed center shaft for rotation about said first axis of rotation, for rotatably supporting said plurality of vane assemblies;

said plurality of vane assemblies being rotatably mounted to said support means for rotation therewith about said first axis of rotation and for rotating about mutually spaced second axes of rotation, parallel to and symmetrically spaced from and about said first axis of rotation, said second axes of rotation intersecting said support means at a plurality of first points fixed with respect thereto;

said plurality of vane assemblies including only a given number of vanes, every vane of said given number of vanes being rotatable about third axes of rotation parallel to and spaced in only one corresponding direction from said second axes of rotation, said third axes of rotation intersecting said plurality of vane assemblies at second points fixed with respect thereto;

first means, responsive to full turns of said support means about said first axis of rotation, for continuously rotating said plurality of vane assemblies corresponding full turns about said second axes of rotation in such a manner that lines respectively passing through said second axes of rotations and said third axis of rotation are always perpendicular to the flow direction whereby every vane of said given number of vanes revolve along an eccentric circular path about said center shaft; and second means, responsive to full turns of each said plurality of vane assemblies about said second axes of rotation, for continuously rotating said vanes corresponding half turns about said third axes of rotation in such a manner that each vane of said given number of vanes is oriented perpendicular to the flow direction when its third axis of rotation is furthest from said first axis of rotation and parallel to the flow direction when its third axis of rotation is closest to said first axis of rotation, whereby every one of said given number of vanes maximally collects energy from the flow energy.

7. A device for collecting the flow energy of the wind or like flow flowing in a flow direction as rotational energy, comprising:

a fixed center shaft extending along a first axis of rotation perpendicular to the flow direction;

a vane assembly;

support means, rotatably mounted to said fixed center shaft for rotation about said first axis of rotation, for rotatably supporting said vane assembly;

said vane assembly being rotatably mounted to said support means for rotation therewith about said first axis of rotation and for rotation with respect thereto about a second axis of rotation, parallel to and spaced from said first axis of rotation, said second axis of rotation intersecting said support means at a fixed point with respect thereto;

said vane assembly including only one vane rotatable about a third axis of rotation parallel to and spaced from said second axis of rotation, said third axis of rotation intersecting the vane assembly at a second point fixed with respect thereto;

means, responsive to full turns of said support means about said first axis of rotation, for continuously rotating said vane assembly corresponding full turns about said second axis of rotation in a manner such that a line passing through said second axis of rotation and said third axis of rotation is always perpendicular to the flow direction so that said third axis of rotation revolves along an eccentric circular path about said first axis of rotation; and means, responsive to full turns of said vane assembly about said second axis of rotation, for continuously rotating said only one vane corresponding half turns about said third axis of rotation in a manner such that said only one vane is oriented perpendicular to the flow then said third axis of rotation is farthest away from said first axis of rotation and parallel to the flow when said third axis of rotation is closest to the first axis of rotation, whereby said only one vane maximally collects energy form the flow energy.

8. A device as in claim 7, wherein said support means includes first and second support discs rotatably mounted to opposite ends of said center shaft, said vane assembly being rotatably mounted to said first and second support discs.

9. A device as in claim 8, wherein said vane assembly includes:
first and second intermediate shafts rotatably mounted to peripheral portions of said first and second support discs along said second axis of rotation;
first and second arms respectively fixed to said first and second intermediate shafts; and
only one self-rotation shaft rotatably mounted to and extending between said first and second arms along said third axis of rotation, said only one vane being fixed to said self-rotation shaft.

10. A device for collecting flow energy flowing in a flow direction as rotational energy, comprising:
a fixed center shaft extending along a central axis of rotation;
support means rotatably mounted to said fixed center shaft for rotation about said central axis of rotation;
a vane assembly supported by said support means for rotation therewith about said central axis of rotation and including only one vane rotatable about a vane axis of rotation parallel to and spaced from said central axis of rotation;
means, responsive to full turns of said support means about said central axis of rotation, for causing said vane axis to rotate along an eccentric circular path about said first axis of rotation;
means, responsive to full turns of said support means about said central axis of rotation, for continuously rotating said only one vane corresponding half turns about said vane axis of rotation in a manner such that said only one vane oriented perpendicular to the flow direction when the vane axis of rotation is farthest away from said central axis of rotation and parallel to the flow direction when said vane axis of rotation is closest to said central axis of rotation; whereby said only one vane maximally collects energy from the flow energy.

* * * * *